United States Patent
Bailey et al.

(10) Patent No.: US 12,296,553 B2
(45) Date of Patent: *May 13, 2025

(54) SOUND DAMPING GYPSUM BOARD AND METHOD OF CONSTRUCTING A SOUND DAMPING GYPSUM BOARD

(71) Applicant: Gold Bond Building Products, LLC, Charlotte, NC (US)

(72) Inventors: Joseph J. Bailey, Charlotte, NC (US); Eli Stav, Charlotte, NC (US); Richard Weir, Indian Trail, NC (US); R. G. Iyer, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,158

(22) Filed: Nov. 13, 2023

(65) Prior Publication Data

US 2024/0075708 A1 Mar. 7, 2024

Related U.S. Application Data

(63) Continuation of application No. 18/157,152, filed on Jan. 20, 2023, now Pat. No. 11,845,238, which is a continuation of application No. 16/705,288, filed on Dec. 6, 2019, now Pat. No. 11,559,968.

(60) Provisional application No. 62/776,058, filed on Dec. 6, 2018.

(51) Int. Cl.
| | |
|---|---|
| *B32B 13/12* | (2006.01) |
| *B32B 27/30* | (2006.01) |
| *E04B 1/86* | (2006.01) |
| *E04C 2/288* | (2006.01) |
| *E04C 2/52* | (2006.01) |
| *G10K 11/168* | (2006.01) |

(52) U.S. Cl.
CPC ............ *B32B 13/12* (2013.01); *B32B 27/308* (2013.01); *E04B 1/86* (2013.01); *E04C 2/288* (2013.01); *E04C 2/526* (2013.01); *G10K 11/168* (2013.01); *B32B 2307/10* (2013.01); *B32B 2419/04* (2013.01)

(58) Field of Classification Search
CPC ................ B32B 13/12; B32B 27/308; B32B 2307/10; B32B 2419/04; E04B 1/86; E04C 2/288; E04C 2/526; G10K 11/168
See application file for complete search history.

(56) References Cited

U.S. PATENT DOCUMENTS

| | | |
|---|---|---|
| 1,769,519 A | 7/1930 | King et al. |
| 1,867,797 A | 7/1932 | Armstrong |
| 1,996,032 A | 3/1935 | Roos |
| 1,996,033 A | 3/1935 | King |
| 2,045,311 A | 6/1936 | Roos et al. |
| 2,045,312 A | 6/1936 | Roos et al. |
| 3,087,567 A | 4/1963 | Guenther |
| 3,215,225 A | 11/1965 | Francies |
| 3,350,257 A | 10/1967 | Hourigan et al. |
| 3,424,270 A | 1/1969 | Hartman et al. |
| 3,489,242 A | 1/1970 | Gladding et al. |
| 3,511,741 A | 5/1970 | Elder |
| 3,562,092 A | 2/1971 | Oberst et al. |
| 3,652,360 A | 3/1972 | Hartman et al. |
| 3,674,624 A | 7/1972 | Oberst et al. |
| 3,894,169 A | 7/1975 | Miller |
| 4,663,224 A | 5/1987 | Tabata et al. |
| 4,964,243 A | 10/1990 | Reiter |
| 5,063,098 A | 11/1991 | Niwa et al. |
| 5,103,614 A | 4/1992 | Kawaguchi et al. |
| 5,125,475 A | 6/1992 | Ducharme et al. |
| 5,198,052 A | 3/1993 | Ali |
| 5,258,585 A | 11/1993 | Juriga |
| 5,411,810 A | 5/1995 | Hirakouchi et al. |
| 5,438,806 A | 8/1995 | Reinhall |
| 5,477,652 A | 12/1995 | Torrey et al. |
| 5,502,931 A | 4/1996 | Munir |
| 5,543,193 A | 8/1996 | Tesch |
| 5,584,950 A | 12/1996 | Gaffigan |
| 5,604,025 A | 2/1997 | Tesch |
| 5,691,037 A | 11/1997 | McCutcheon et al. |
| 5,907,932 A | 6/1999 | LeConte et al. |
| 5,975,238 A | 11/1999 | Fuchs et al. |
| 6,048,426 A | 4/2000 | Pratt |
| 6,077,613 A | 6/2000 | Gaffigan |
| 6,145,617 A | 11/2000 | Alts |
| 6,202,462 B1 | 3/2001 | Hansen et al. |
| 6,287,664 B1 | 9/2001 | Pratt |
| 6,309,985 B1 | 10/2001 | Virnelson et al. |
| 6,334,280 B1 | 1/2002 | Frappart et al. |
| 6,467,521 B1 | 10/2002 | Pratt |
| 6,640,507 B1 | 11/2003 | Leconte |

(Continued)

FOREIGN PATENT DOCUMENTS

| | | |
|---|---|---|
| EP | 1251215 | 10/2002 |
| GB | 1489825 | 10/1977 |
| GB | 2499063 | 8/2013 |
| JP | S5444971 | 12/1979 |
| JP | 2004042557 | 2/2004 |
| WO | WO2010042993 | 4/2010 |

OTHER PUBLICATIONS

CSTB, Document Technique d'Application: Knauf BA25-BA18/900, Jul. 18, 2010 (www.ctsb.fr/pdf/atec/GS09-JAJ090884_V1.pdf).

Product Info on QuietGlue QG-311 from Quiet Solution, 2005, 2 pages.

*Primary Examiner* — Forrest M Phillips
(74) *Attorney, Agent, or Firm* — Dority & Manning, P.A.

(57) ABSTRACT

The present invention is directed to an improved gypsum board, such as an improved sound damping gypsum board. The gypsum board comprises a gypsum core including gypsum and a sound damping polymer. The gypsum core includes a first gypsum layer surface and a second gypsum layer surface opposing the first gypsum layer surface. In addition, a first encasing layer is disposed on the first gypsum layer surface and a second encasing layer is disposed on the second gypsum layer surface.

18 Claims, No Drawings

(56) References Cited

U.S. PATENT DOCUMENTS

| | | |
|---|---|---|
| 6,739,532 B2 | 5/2004 | McCamley |
| 6,808,793 B2 | 10/2004 | Randall et al. |
| 6,828,020 B2 | 12/2004 | Fisher et al. |
| 6,901,713 B2 | 6/2005 | Axsom |
| 6,998,359 B2 | 2/2006 | Bingenheimer |
| 7,056,582 B2 | 6/2006 | Carbo et al. |
| 7,181,891 B2 | 2/2007 | Surace et al. |
| 7,344,772 B2 | 3/2008 | Rehfeld et al. |
| 7,603,824 B1 | 10/2009 | Hartanto |
| 7,705,101 B2 | 4/2010 | Sherman et al. |
| 7,745,005 B2 | 6/2010 | Tinianov |
| 7,798,287 B1 | 9/2010 | Surace et al. |
| 7,799,410 B2 | 9/2010 | Tinianov |
| 7,833,916 B2 | 11/2010 | Leeser et al. |
| 7,883,763 B2 | 2/2011 | Tinianov |
| 7,908,818 B2 | 3/2011 | Tinianov et al. |
| 7,909,136 B2 | 3/2011 | Surace et al. |
| 7,921,965 B1 | 4/2011 | Surace |
| 7,973,106 B2 | 7/2011 | Fisk et al. |
| 7,987,645 B2 | 8/2011 | Tinianov |
| 8,028,800 B2 | 10/2011 | Ravnaas |
| 8,029,881 B2 | 10/2011 | Surace et al. |
| 8,057,915 B2 | 11/2011 | Song et al. |
| 8,181,417 B2 | 5/2012 | Surace et al. |
| 8,181,738 B2 | 5/2012 | Tinianov et al. |
| 8,397,864 B2 | 3/2013 | Tinianov et al. |
| 8,424,251 B1 | 4/2013 | Tinianov |
| 8,448,389 B2 | 5/2013 | Doneux et al. |
| 8,495,851 B2 | 7/2013 | Surace et al. |
| 8,534,419 B2 | 9/2013 | Coates et al. |
| 8,590,272 B2 | 11/2013 | Thomas et al. |
| 8,590,670 B1 | 11/2013 | Grube et al. |
| 8,684,134 B2 | 4/2014 | Dugan et al. |
| 8,770,345 B2 | 7/2014 | Dugan et al. |
| 8,900,691 B2 | 12/2014 | Rehfeld et al. |
| 8,925,677 B2 | 1/2015 | Dugan et al. |
| 8,926,855 B2 | 1/2015 | Thomas et al. |
| 8,950,549 B2 | 2/2015 | Coates et al. |
| 9,033,102 B2 | 5/2015 | Payot et al. |
| 9,045,898 B2 | 6/2015 | Ravnaas |
| 9,051,731 B2 | 6/2015 | Thomas et al. |
| 9,085,894 B2 | 7/2015 | Eckman et al. |
| 9,102,122 B2 | 8/2015 | Rehfeld et al. |
| 9,157,242 B2 | 10/2015 | Thomas et al. |
| 9,200,438 B2 | 12/2015 | Blanchard et al. |
| 9,334,662 B2 | 5/2016 | Spanton et al. |
| 9,387,649 B2 | 7/2016 | Tinianov et al. |
| 9,388,568 B2 | 7/2016 | Tinianov |
| 9,446,458 B2 | 9/2016 | Huchet |
| 9,487,952 B2 | 11/2016 | Nilsson et al. |
| 9,499,975 B2 | 11/2016 | Thomas et al. |
| 9,512,613 B2 | 12/2016 | Blades et al. |
| 9,561,601 B2 | 2/2017 | Santamaria et al. |
| 9,580,901 B2 | 2/2017 | Payot et al. |
| 9,623,627 B2 | 4/2017 | Coates et al. |
| 9,637,913 B2 | 5/2017 | Ravnaas |
| 9,733,173 B2 | 8/2017 | Rehfeld et al. |
| 9,890,530 B2 | 2/2018 | Tierney et al. |
| 9,903,116 B2 | 2/2018 | Ray |
| 9,909,304 B2 | 3/2018 | Blades et al. |
| 10,174,499 B1 | 1/2019 | Tinianov |
| 11,559,968 B2 | 1/2023 | Bailey et al. |
| 11,845,238 B2 * | 12/2023 | Bailey ............... E04C 2/043 |
| 2002/0028332 A1 | 3/2002 | Pratt |
| 2002/0081410 A1 | 6/2002 | Buckwalter et al. |
| 2003/0070367 A1 | 4/2003 | Gelin et al. |
| 2003/0077443 A1 | 4/2003 | Di Stefano et al. |
| 2003/0141144 A1 | 7/2003 | Wilson |
| 2004/0026002 A1 | 2/2004 | Weldon et al. |
| 2004/0048022 A1 | 3/2004 | Pratt |
| 2004/0219322 A1 | 11/2004 | Fisher et al. |
| 2005/0080193 A1 | 4/2005 | Wouters et al. |
| 2005/0153613 A1 | 7/2005 | Bingehneimer |
| 2005/0196608 A1 | 9/2005 | Wouters et al. |
| 2005/0211500 A1 | 9/2005 | Wendt et al. |
| 2005/0255318 A1 | 11/2005 | Czerny |
| 2006/0000670 A1 | 1/2006 | Dodd |
| 2006/0182978 A1 | 8/2006 | Leroy et al. |
| 2006/0191743 A1 | 8/2006 | Pike et al. |
| 2007/0102237 A1 | 5/2007 | Baig |
| 2007/0137139 A1 | 6/2007 | Tierney et al. |
| 2007/0175173 A1 | 8/2007 | Babineau, Jr. et al. |
| 2008/0171179 A1 | 7/2008 | Surace et al. |
| 2008/0178544 A1 | 7/2008 | Clark et al. |
| 2008/0251198 A1 | 10/2008 | Tinianov |
| 2008/0264721 A1 | 10/2008 | Tinianov et al. |
| 2009/0000245 A1 | 1/2009 | Tinianov |
| 2009/0000866 A1 | 1/2009 | Tinianov |
| 2009/0004448 A1 | 1/2009 | Tinianov |
| 2009/0107059 A1 | 4/2009 | Kipp et al. |
| 2009/0239429 A1 | 9/2009 | Kipp et al. |
| 2009/0280356 A1 | 11/2009 | Tinianov et al. |
| 2010/0018799 A1 | 1/2010 | Boyadjian et al. |
| 2010/0038169 A1 | 2/2010 | Lee |
| 2010/0066121 A1 | 3/2010 | Gross |
| 2010/0126800 A1 | 5/2010 | Albin, Jr. |
| 2010/0180916 A1 | 7/2010 | Colon et al. |
| 2010/0230206 A1 | 9/2010 | Tinianov et al. |
| 2010/0258378 A1 | 10/2010 | Ravnaas |
| 2010/0273382 A1 | 10/2010 | Nandi et al. |
| 2011/0076470 A1 | 1/2011 | Belady et al. |
| 2011/0064916 A1 | 3/2011 | Sherman et al. |
| 2011/0252739 A1 | 10/2011 | Leeser et al. |
| 2011/0271638 A1 | 11/2011 | Tierney et al. |
| 2011/0296794 A1 | 12/2011 | Thomas et al. |
| 2012/0024626 A1 | 2/2012 | Coates et al. |
| 2012/0058289 A1 | 3/2012 | Coates et al. |
| 2012/0073899 A1 | 3/2012 | Fournier et al. |
| 2013/0087409 A1 | 4/2013 | Payot et al. |
| 2013/0240111 A1 | 9/2013 | Tinianov |
| 2013/0240291 A1 | 9/2013 | Tinianov |
| 2013/0316158 A1 | 11/2013 | Rehfeld et al. |
| 2014/0273687 A1 | 9/2014 | Garvey et al. |
| 2015/0218804 A1 | 8/2015 | Payot et al. |
| 2015/0322670 A1 | 11/2015 | Hotchin et al. |
| 2016/0230395 A1 | 8/2016 | Cusa et al. |
| 2017/0015085 A1 | 1/2017 | Chuda et al. |
| 2017/0165945 A1 | 6/2017 | Payen et al. |
| 2017/0210097 A1 | 7/2017 | Payen et al. |
| 2017/0225426 A1 | 8/2017 | Glean et al. |
| 2018/0171626 A1 | 6/2018 | Shi et al. |
| 2018/0320369 A1 | 11/2018 | Garvey et al. |
| 2018/0330709 A1 | 11/2018 | McGrail et al. |
| 2019/0017261 A1 | 1/2019 | Chuda et al. |
| 2019/0030860 A1 | 1/2019 | Chuda et al. |
| 2019/0071867 A1 | 3/2019 | Tinianov |
| 2019/0093343 A1 | 3/2019 | Dimitrakopoulos et al. |
| 2019/0093354 A1 | 3/2019 | Dimitrakopoulos et al. |

* cited by examiner

SOUND DAMPING GYPSUM BOARD AND METHOD OF CONSTRUCTING A SOUND DAMPING GYPSUM BOARD

CROSS-REFERENCE TO RELATED APPLICATION

The present application is a continuation of U.S. application Ser. No. 18/157,152 having a filing date of Jan. 20, 2023, which is a continuation of U.S. application Ser. No. 16/705,288 having a filing date of Dec. 6, 2019, which claims the benefit of U.S. Provisional Application No. 62/776,058 having a filing date of Dec. 6, 2018, all of which are hereby incorporated in their entirety.

BACKGROUND

A building is typically constructed with walls having a frame comprising vertically oriented studs connected by horizontally oriented top and bottom plates or tracks. The walls often include one or more gypsum boards fastened to the studs and/or plates on each side of the frame or, particularly for exterior walls, one or more gypsum boards fastened to the studs and/or plates on one side of the frame with a non-gypsum based sheathing attached to an exterior side of the frame. A ceiling of the building may also include one or more gypsum boards oriented horizontally and fastened to joists, studs, or other structural members extending horizontally in the building. Walls and ceilings of this construction often have poor acoustical performance and a low sound transmission class (STC) rating, which results in noise pollution, lack of privacy, and similar issues in the various spaces of the building. One of the aspects of this poor performance is the coincidence between the human voice Hertz spectrum and the vibrational Hertz range of standard gypsum board, which creates a unique dip in the acoustical curve of a standard frame and gypsum board wall.

While boards currently exist that provide sound damping, there is still a need to further improve the acoustical performance of the boards and provide improved sound damping.

SUMMARY OF THE INVENTION

In accordance with one embodiment of the present invention, a gypsum board is disclosed. The gypsum board comprises a gypsum core including gypsum and a sound damping polymer. The gypsum core includes a first gypsum layer surface and a second gypsum layer surface opposing the first gypsum layer surface. In addition, a first encasing layer is disposed on the first gypsum layer surface and a second encasing layer is disposed on the second gypsum layer surface.

In accordance with another embodiment of the present invention, a method of forming a gypsum board is disclosed. The method comprises depositing a gypsum slurry comprising stucco, a sound damping polymer, and water on a first encasing layer; providing a second encasing layer on the slurry, and allowing the stucco to convert to calcium sulfate dihydrate.

DETAILED DESCRIPTION

Reference now will be made in detail to embodiments, one or more examples of which are illustrated in the drawings. Each example is provided by way of explanation of the embodiments, not as a limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a gypsum board, such as an improved sound damping gypsum board, comprising a gypsum core including a sound damping polymer. The present inventors have discovered that by providing such a polymer within the gypsum core, certain benefits can be realized. In particular, such gypsum boards can be effective in improving the acoustical performance of the gypsum board thereby minimizing the transmission of noise through a wall containing such gypsum boards.

For instance, in comparison to conventional gypsum board, in particular an existing, installed gypsum board without a sound damping layer, the sound damping gypsum board as disclosed herein would exhibit a sound transmission loss of 5% or more, such as 10% or more, such as 15% or more, such as 20% or more, such as 25% or more, such as 30% or more, such as 35% or more, such as 40% or more, such as 45% or more, such as 50% or more and less than 100%, such as less than 90%, such as less than 80%, such as 70% or less, such as 60% or less in comparison to the conventional gypsum board without a sound damping layer. Such comparison may be at any frequency and in particular at a frequency of 100 Hz or more, such as 125 Hz or more, such as 500 Hz or more, such as 1000 Hz or more, such as 2000 Hz or more, such as 2500 Hz or more, such as 3150 Hz or more, such as 4000 Hz or more. In particular, such comparison may be at 100 Hz, such as 125 Hz, such as at 500 Hz, such as at 1000 Hz, such as at 2000 Hz, such as at 2500 Hz, such as at 3150 Hz, such as at 4000 Hz. In addition, such comparison may be at any 2, such as at any 3, such as at any 4, such as at any 5 of the aforementioned frequencies.

Further, the sound transmission loss for a wall assembly including the sound damping gypsum board as disclosed herein may be 1% or more, such as 2% or more, such as 5% or more, such as 10% or more, such as 15% or more, such as 20% or more, such as 30% or more than the sound transmission loss for a wall assembly not including a sound damping layer as disclosed herein. Such comparison may be at any frequency and in particular at a frequency of 500 Hz or more, such as 1000 Hz or more, such as 2000 Hz or more, such as 2500 Hz or more, such as 4000 Hz or more. In particular, such comparison may be at 500 Hz, such as at 1000 Hz, such as at 2000 Hz, such as at 2500 Hz, such as at 4000 Hz. In addition, such comparison may be at any 2, such as at any 3, such as at any 4, such as at any 5 of the aforementioned frequencies.

In addition, at a frequency of 1000 Hz, the sound transmission loss of the sound damping gypsum board as disclosed herein may be 55 dB or more, such as 56 dB or more, such as 57 dB or more, such as 58 dB or more, such as 60 dB or more. At a frequency of 2000 Hz, the sound transmission loss of the sound damping gypsum board as disclosed herein may be more than 50 dB, such as 51 dB or more, such as 52 dB or more, such as 53 dB or more, such as 55 dB or more, such as 57 dB or more. At a frequency of 4000 Hz, the sound transmission loss of the sound damping gypsum board as disclosed herein may be more than 52 dB, such as 53 dB or more, such as 55 dB or more, such as 57 dB or more, such as 59 dB or more, such as 60 dB or more.

In general, the present invention is directed to a sound damping gypsum board. The sound damping gypsum board includes a gypsum core including a sound damping polymer. In general, the composition of the gypsum core is not necessarily limited and may be any gypsum core generally known in the art. Generally, in one embodiment, the gypsum core is made from a gypsum slurry including at least stucco, water, and the sound damping polymer. In such embodiment, the sound damping polymer is provided within the gypsum core by mixing the sound damping polymer directly with the stucco and water to form the gypsum slurry. However, as further explained below, it should be understood that other techniques may also be utilized for incorporating the sound damping polymer within the gypsum core.

In general, stucco may be referred to as calcined gypsum or calcium sulfate hemihydrate. The calcined gypsum may be from a natural source or a synthetic source and is thus not necessarily limited by the present invention. In addition to the stucco, the gypsum slurry may also contain some calcium sulfate dihydrate or calcium sulfate anhydrite. If calcium sulfate dihydrate is present, the hemihydrate is present in an amount of at least 50 wt. %, such as at least 60 wt. %, such as at least 70 wt. %, such as at least 80 wt. %, such as at least 85 wt. %, such as at least 90 wt. %, such as at least 95 wt. %, such as at least 98 wt. %, such as at least 99 wt. % based on the weight of the calcium sulfate hemihydrate and the calcium sulfate dihydrate. Furthermore, the calcined gypsum may be α-hemihydrate, β-hemihydrate, or a mixture thereof.

In addition to the stucco, the gypsum slurry may also contain other hydraulic materials. These hydraulic materials may include calcium sulfate anhydrite, land plaster, cement, fly ash, or any combinations thereof. When present, they may be utilized in an amount of 30 wt. % or less, such as 25 wt. % or less, such as 20 wt. % or less, such as 15 wt. % or less, such as 10 wt. % or less, such as 8 wt. % or less, such as 5 wt. % or less based on the total content of the hydraulic material.

Meanwhile, the sound damping polymer may be any polymer that can provide an improved acoustical performance or sound damping effect. For instance, the sound damping polymer may comprise a thermoplastic polymer or a thermoset polymer. In one embodiment, the sound damping polymer comprises a thermoplastic polymer. In another embodiment, the sound damping polymer comprises a thermoset polymer. In one particular embodiment, the sound damping polymer may be an elastomer, in particular a thermoplastic elastomer.

Suitable sound damping polymers include, as non-limiting examples, synthetic resins, polymers and copolymers, and latex polymers as are known in the art. In a preferred embodiment, the sound damping polymer is an acrylic (or acrylate) polymer or copolymer. One such non-limiting example is Acronal®, an acrylate copolymer commercially available from BASF (Charlotte, NC). Another non-limiting example is QuietGlue™, which includes an acrylic (or acrylate) polymer and in particular two of such polymers. The formulation for QuietGlue™ can be found in U.S. Pat. No. 7,921,965, which is incorporated herein by reference in its entirety. When provided in a formulation, the concentration of the acrylic (acrylate) polymer may not necessarily be limited. However, such formulation should have sufficient fluidity (e.g., with the presence of water) to allow for the formulation and polymer to be handled and processed for incorporation into the gypsum slurry. Alternatively, because the sound damping polymer may be applied at an interface (e.g., on a first encasing layer prior to deposition of the gypsum slurry or on the gypsum slurry prior to deposition of a second encasing layer), it should also have sufficient fluidity for application at an interface of an encasing layer and the gypsum slurry such that the formulation and sound damping polymer may penetrate at least some of the gypsum slurry such that it is present within the gypsum core even though it may not have been directly added to the gypsum slurry.

In addition, it should be understood that the boards disclosed herein may contain more than one sound damping polymer. For instance, in one embodiment, the boards include at least one sound damping polymer. In another embodiment, the boards disclosed herein may contain at least two sound damping polymers.

The sound damping polymer may be provided as a formulation that may also comprise various additives, including anti-microbial materials for fungal protection and appropriate fillers such as, in non-limiting examples, vermiculite, expanded mica, talc, lead, and granulated polystyrene aluminum oxide. Additional embodiments include a tacky adhesive constructed of one or more polymers having fluidity at an ordinary temperature and one or more emulsion type or solvent type polymers consisting of one or more natural rubbers, synthetic rubbers, and polymers such as, in non-limiting examples, acrylic resin and silicone resin. A tackifier, including such non-limiting examples as petroleum resin and sap, a softener, and/or a plasticizer are included in the sound damping layer in one or more embodiments of the present disclosure. Other non-limiting examples of additives used to form the sound damping material include polyester resins, resins constructed from plasticizers or peroxide being added to polyester, multiple polyesters, polyurethane foam, polyamide resin, ethylene-vinyl acetate copolymers, ethylene acrylic acid copolymers, polyurethane copolymers, and EPDM polymers. In one or more embodiments, the sound damping material comprises a polymer having a dynamic glass transition temperature at or below the working temperature at which the sound damping layer will be used. For instance, the working temperature may be the temperature at which the sound damping polymer will be utilized. For example, it may be the temperature of the gypsum slurry in one embodiment.

In this regard, in one embodiment, the sound damping polymer may be provided as a glue, such as a viscoelastic glue. Such glue may be provided to a gypsum slurry for forming the gypsum core. Such glue may be provided at an interface for penetration into the gypsum slurry such that it is present within the gypsum core.

In addition, the sound damping polymer may have a relatively low glass transition temperature. For instance, the polymer may have a glass transition temperature of room temperature or less. For instance, the polymer may have a glass transition temperature of 25° C. or less, such as 20° C. or less, such as 10° C. or less, such as 5° C. or less, such as 1° C. or less, such as 0° C. or less, such as −5° C. or less, such as −10° C. or less, such as −15° C. or less, such as −20° C. or less, such as −25° C. or less, such as −30° C. or less, such as −35° C. or less, such as −40° C. or less, such as −50° C. or less. The polymer may have a glass transition temperature of −90° C. or more, such as −80° C. or more, such as −75° C. or more, such as −70° C. or more, such as −65° C. or more, such as −60° C. or more, such as −55° C. or more, such as −50° C. or more, such as −40° C. or more, such as −30° C. or more.

The sound damping polymer may be present in the gypsum board in an amount to provide a desired sound damping effect. When making the board, the sound damping polymer may be present in an amount of 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more based on the weight of the stucco. The sound damping polymer may be present in an amount of 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco. In addition, the aforementioned weight percentages may also apply based on the weight of the gypsum in the gypsum board. In addition, the aforementioned weight percentages may also apply based on the weight of the gypsum board.

The sound damping polymer may be present in an amount of 0.001 lbs/MSF or more, such as 0.01 lbs/MSF or more, such as 0.05 lbs/MSF or more, such as 0.1 lbs/MSF or more, such as 0.2 lbs/MSF or more, such as 0.25 lbs/MSF or more, such as 0.5 lbs/MSF or more, such as 0.75 lbs/MSF or more, such as 1 lb/MSF or more, such as 1.5 lbs/MSF or more, such as 2 lbs/MSF or more, such as 2.5 lbs/MSF or more, such as 3 lbs/MSF or more, such as 4 lbs/MSF or more. The sound damping polymer may be present in an amount of 150 lbs/MSF or less, such as 100 lbs/MSF or less, such as 50 lbs/MSF or less, such as 25 lbs/MSF or less, such as 15 lbs/MSF or less, such as 10 lbs/MSF or less, such as 5 lbs/MSF or less, such as 4 lbs/MSF or less, such as 3 lbs/MSF or less, such as 2.5 lbs/MSF or less, such as 2 lbs/MSF or less, such as 1.5 lbs/MSF or less, such as 1 lbs/MSF or less. Such MSF value may be the weight of the board.

The sound damping polymer may also be provided with or used in conjunction with materials or additives that may provide different sound damping effects and performance. For instance, with respect to such additives, one may have a higher density than the other additive. These additives may include, but are not limited to, microspheres (e.g., hollow microspheres, filled microspheres), glass spheres, cenospheres, waste materials, minerals (e.g., high density, low density), metals, etc.

In addition, a formulation including the sound damping polymer may also include other optional additives. For instance, these additives may include one or more additives that are conventionally used within the gypsum core (e.g., calcium sulfate hemihydrate, calcium sulfate dihydrate, natural polymers such as starches, phosphates, and the like). In one embodiment, such additives may include cellulosic materials such as cellulose fibers, microcellulose, nanocellulose, and the like. The additives may include coated and uncoated inorganic materials (e.g., porous siliceous materials, minerals, and the like). The additives may include plated or hollow materials such as mica, graphite, micro-glass flakes, glass micro- or nanobubbles, or mixtures thereof. The additives may include density altering materials such as barium sulfate, fly ash, calcium carbonate, ground or cut rubber, mixtures thereof, and the like. The additives may include porous natural materials such as wood chips, saw dust, rice husks, other fibrous materials, etc., and mixtures thereof. The additives may include those that alter the fluidity such as surfactants and dispersants. The additives may include those that alter the rate and degree of curing and adhesion such as tackifiers.

As indicated above, the gypsum slurry may also include water. Water may be employed for fluidity and also for rehydration of the gypsum to allow for setting. The amount of water utilized is not necessarily limited by the present invention.

In addition, the weight ratio of the water to the stucco may be 0.1 or more, such as 0.2 or more, such as 0.3 or more, such as 0.4 or more, such as 0.5 or more. The water to stucco weight ratio may be 4 or less, such as 3.5 or less, such as 3 or less, such as 2.5 or less, such as 2 or less, such as 1.7 or less, such as 1.5 or less, such as 1.4 or less, such as 1.3 or less, such as 1.2 or less, such as 1.1 or less, such as 1 or less, such as 0.9 or less, such as 0.85 or less, such as 0.8 or less, such as 0.75 or less, such as 0.7 or less, such as 0.6 or less, such as 0.5 or less, such as 0.4 or less, such as 0.35 or less, such as 0.3 or less, such as 0.25 or less, such as 0.2 or less.

In addition to the stucco, the sound damping polymer, and the water, the gypsum slurry may also include any other conventional additives as known in the art. In this regard, such additives are not necessarily limited by the present invention. For instance, the additives may include dispersants, foam or foaming agents including aqueous foam (e.g. sulfates), set accelerators (e.g., BMA, land plaster, sulfate salts, etc.), set retarders, binders, biocides (such as bactericides and/or fungicides), adhesives, pH adjusters, thickeners (e.g., silica fume, Portland cement, fly ash, clay, celluloses, high molecular weight polymers, etc.), leveling agents, non-leveling agents, starches (such as pregelatinized starch, non-pregelatinized starch, and/or an acid modified starch), colorants, fire retardants or additives (e.g., silica, silicates, expandable materials such as vermiculite, perlite, etc.), water repellants, fillers (e.g., glass fibers), waxes, secondary phosphates (e.g., condensed phosphates or orthophosphates including trimetaphosphates, polyphosphates, and/or cyclophosphates, etc.), mixtures thereof, natural and synthetic polymers, etc. In general, it should be understood that the types and amounts of such additives are not necessarily limited by the present invention.

In general, each additive may be present in the gypsum slurry in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more based on the weight of the stucco. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco.

The present invention is also directed to a method of making a gypsum slurry. The method includes a step of combining stucco, water, and a sound damping polymer as defined herein. The method may also include combining any of the other aforementioned components mentioned above with respect to the gypsum slurry. In the instance the sound damping polymer is provided at the interface for penetration into the gypsum slurry such that it is present within the gypsum core, such embodiment may simply include a step of combining stucco, water, and any other optional additives.

The manner in which the components are combined is not necessarily limited. For instance, the gypsum slurry can be made using any method or device generally known in the art. In particular, the components of the slurry can be mixed or combined using any method or device generally known in the art. For instance, the components of the gypsum slurry may be combined in any type of device, such as a mixer and in particular a pin mixer. In this regard, the manner in which the sound damping polymer is incorporated into the gypsum slurry is not necessarily limited by the present invention. For instance, the sound damping polymer may be provided prior to a mixing device, directly into a mixing device, and/or even after the mixing device. For instance, the sound damping polymer may be provided prior to a mixing device. In another embodiment, the sound damping polymer may be provided directly into a mixing device. Alternatively, the sound damping polymer may be provided after the mixing device (such as to the canister or boot or using a secondary mixer) and may be added directly or as part of a mixture. Whether provided prior to, into, or after the mixing device, the sound damping polymer may be combined directly with another component of the gypsum slurry. In addition, whether providing the sound damping polymer prior to or after the mixing device or directly into the mixing device, the compound may be delivered as a solid, as a dispersion/solution, or a combination thereof.

In this regard and as indicated above, in one embodiment, the sound damping polymer may be provided with a carrier material. For instance, the carrier material may be a material to assist in the delivery of the sound damping polymer. The carrier material may be a liquid, a solid, or a mixture thereof. In one embodiment, the carrier material comprises a solid. In another embodiment, the carrier material comprises at least a liquid. In particular, the sound damping polymer may be delivered or provided as solution, an emulsion or a dispersion.

The carrier material may include any of the additives as mentioned above and considered herein. For instance, the carrier material may be a plasticizer (e.g., glycerin and/or it's ethoxylated derivatives, dicarboxylic/tricarboxylic ester-based plasticizers such as phthalates, trimellitates, adipates, sebacates, maleates, azelates, benzoates, terephthalates, sulfonamides, organophosphates, glycols and polyethers, etc., and mixtures thereof), a soap or foaming agent (e.g., sulfates such as ammonium ether sulfates and alkyl ether sulfates including laureth sulfates, laureth ether sulfates, and lauryl sulfates; sulfonates; sulfosuccinates; sulfolaurates; alcohol ethoxylates; amine oxides; betaines; etc. and mixtures thereof), a dispersant, a starch, a polymer (e.g., a thermoplastic polymer such as polystyrene), filler materials (e.g., perlite, clay such as expanded clay, hollow microspheres, etc.).

As indicated above, the carrier may include a plasticizer, a foaming agent, and/or a dispersant. In this regard, the carrier may be anionic, nonionic, or amphoteric or the carrier may include mixtures thereof. In one embodiment, the carrier may include at least an anionic. In another embodiment, the carrier may include at least a nonionic. In a further embodiment, the carrier may include at least an amphoteric.

Also, the carrier may be a starch. The starch may be a migrating starch such that it migrates. Because of such migration, the starch may assist with moving the sound damping polymer within the gypsum core. For instance, the starch may assist with moving the sound damping polymer towards the interface between the gypsum core and the encasing material. Alternatively, the starch may be a non-migrating starch. In addition, the starch may be any as known in the art. The starch may be an unmodified starch or a modified starch. For instance, the starch may be a pearl starch, a pregelatinized starch, an acid-modified starch, an extruded starch, etc. The starch may be modified such that it is ethoxylated, ethylated, or acetylated. In addition, the starch may be a corn starch, a wheat starch, a milo starch, or other commercially available starch. Furthermore, the starch may include a combination of starches (e.g., migrating and non-migrating) in order to control the dispersibility of the sound damping polymer.

In addition, the hollow microspheres may include ceramic, glass, polymeric, etc. In one example, the hollow microsphere may be a cenosphere. For instance, the microsphere may have a certain shell such as one made of alumina, silica, or iron. In addition, the microspheres may include a plurality of microspheres such as a combination of those having a shell made of alumina, silica, or iron. In addition, the microspheres may be filled with a gas (e.g., carbon dioxide, nitrogen and/or other inert gas, air, or a mixture thereof.).

The amount of carrier material employed is not necessarily limited. For instance, the carrier may be present in an amount of about 0.001 wt. % or more, such as 0.01 wt. % or more, such as 0.1 wt. % or more, such as 0.5 wt. % or more, such as 1 wt. % or more, such as 2 wt. % or more, such as 3 wt. % or more, such as 5 wt. % or more, such as 10 wt. % or more, such as 15 wt. % or more, such as 20 wt. % or more, such as 25 wt. % or more, such as 30 wt. % or more, such as 50 wt. % or more such as 75 wt. % or more, such as 100 wt. % or more based on the weight of the sound damping polymer. The carrier may be present in an amount of 500 wt. % or less, such as 400 wt. % or less, such as 300 wt. % or less, such as 200 wt. % or less, such as 100 wt. % or less, such as 90 wt. % or less, such as 80 wt. % or less, such as 70 wt. % or less, such as 50 wt. % or less, such as 40 wt. % or less, such as 35 wt. % or less, such as 25 wt. % or less based on the weight of the sound damping polymer.

In one embodiment, the gypsum core may include a first gypsum layer and a second gypsum layer. The first gypsum layer may be between a first encasing layer (i.e., front of the board) and the second gypsum layer. In addition, the first gypsum layer may have a density greater than the second gypsum layer. Accordingly, the first gypsum layer may be formed without the use of a foaming agent or with a reduced amount of foaming agent, which may be utilized in forming the second gypsum layer. In this regard, in one embodiment, the first gypsum layer may have the same composition as the second gypsum layer except that the second gypsum layer may be formed using a foaming agent.

In one embodiment, the sound damping polymer may be provided in both the first gypsum layer and the second gypsum layer. In another embodiment, the sound damping polymer may be provided in only the second gypsum layer. In a further embodiment, the sound damping polymer may be provided in only the first gypsum layer. Regardless, the sound damping polymer may be provided in the first gypsum layer (e.g., unfoamed gypsum slurry) optionally containing other additives which can be applied directly onto an encasing layer.

In one embodiment, the gypsum core may also include a third gypsum layer. The third gypsum layer may be provided between the second gypsum layer and a second encasing layer. Like the first gypsum layer, the third gypsum layer may also be a dense gypsum layer. In particular, the third gypsum layer may have a density greater than the second gypsum layer. Accordingly, the third gypsum layer may be formed without the use of a foaming agent or with a reduced amount of foaming agent, which may be utilized in forming the second gypsum layer. In this regard, in one embodiment, the third gypsum layer may have the same composition as the second gypsum layer except that the second gypsum layer may be formed using a foaming agent. Furthermore, in one embodiment, the sound damping polymer may be provided in the third gypsum layer, such as only in the third gypsum layer. Alternatively, the sound damping polymer may be provided in the third gypsum layer and at least one of the first or second gypsum layers. In a further embodiment, the sound damping polymer may be provided in all three of the gypsum layers.

The first gypsum layer may have a thickness that is 0.5% or more, such as 1% or more, such as 2% or more, such as 3% or more, such as 4% or more, such as 5% or more, such as 10% or more, such as 15% or more the thickness of the second (or foamed) gypsum layer. The thickness may be 80% or less, such as 60% or less, such as 50% or less, such as 40% or less, such as 30% or less, such as 25% or less, such as 20% or less, such as 15% or less, such as 10% or less, such as 8% or less, such as 5% or less the thickness of the second (or foamed) gypsum layer. In one embodiment, such relationship may also be between the third gypsum layer and the second gypsum layer.

The density of the second (or foamed) gypsum layer may be 0.5% or more, such as 1% or more, such as 2% or more, such as 3% or more, such as 4% or more, such as 5% or more, such as 10% or more, such as 15% or more the density of the first (or non-foamed) gypsum layer. The density of the second (or foamed) gypsum layer may be 80% or less, such as 60% or less, such as 50% or less, such as 40% or less, such as 30% or less, such as 25% or less, such as 20% or less, such as 15% or less, such as 10% or less, such as 8% or less, such as 5% or less the density of the first (or non-foamed) gypsum layer. In one embodiment, such relationship may also be between the third gypsum layer and the second gypsum layer. In addition, in one embodiment, all of the gypsum layers may have a different density.

In addition to a method of making a gypsum slurry, the present invention is also directed to a method of making a gypsum board. The method may include the aforementioned step of combining stucco, water, and a sound damping polymer as defined herein. In addition, the method may also include combining any of the other aforementioned components mentioned above with respect to the gypsum slurry. In the instance the sound damping polymer is provided at the interface for penetration into the gypsum slurry such that it is present within the gypsum core, such embodiment may simply include a step of combining stucco, water, and any other optional additives. The components of the gypsum slurry may be combined in any type of device, such as a mixer and in particular a pin mixer.

Once the gypsum slurry is prepared, the method may comprise a step of depositing the gypsum slurry onto a first encasing layer. The first encasing layer may be conveyed on a conveyor system (i.e., a continuous system for continuous manufacture of gypsum board). In one embodiment, the gypsum slurry may be deposited in one step for forming the gypsum core. In another embodiment, the gypsum slurry may be deposited in two steps for forming the gypsum core. For example, a first gypsum slurry may be deposited followed by a second gypsum slurry. The first gypsum slurry and the second gypsum slurry may have the same composition except that the second gypsum slurry may include a foaming agent or more foaming agent than the first gypsum slurry. In this regard, in one embodiment, the first gypsum slurry may not include a foaming agent. Accordingly, the first gypsum slurry may result in a dense gypsum layer, in particular a non-foamed gypsum layer. Such gypsum layer may have a density greater than the gypsum layer formed from the second gypsum slurry, or foamed gypsum layer.

In another embodiment, the gypsum slurry may be deposited in three steps for forming the gypsum core. For example, a first and second gypsum slurry may be deposited as indicated above and a third gypsum slurry may be deposited onto the second gypsum slurry. The third gypsum slurry and the second gypsum slurry may have the same composition except that the second gypsum slurry may include a foaming agent or more foaming agent than the third gypsum slurry. In this regard, in one embodiment, the third gypsum slurry may not include a foaming agent. Accordingly, the third gypsum slurry may result in a dense gypsum layer, in particular a non-foamed gypsum layer. Such gypsum layer may have a density greater than the gypsum layer formed from the second gypsum slurry, or foamed gypsum layer.

Furthermore, the sound damping polymer may be included in the first gypsum slurry (and corresponding first gypsum layer in the gypsum core), the second gypsum slurry (and corresponding second gypsum layer in the gypsum core), and/or the third gypsum slurry (and corresponding third gypsum layer in the gypsum core). For instance, in one embodiment, the sound damping polymer may be included in the first gypsum slurry (and corresponding first gypsum layer). In another embodiment, the sound damping polymer may be included in the second gypsum slurry (and corresponding second gypsum layer). In a further embodiment, the sound damping polymer may be included in the first gypsum slurry (and corresponding first gypsum layer) and the second gypsum slurry (and corresponding second gypsum layer). In a further embodiment, the sound damping polymer may be included in the first gypsum slurry (and corresponding first gypsum layer) and the third gypsum slurry (and corresponding third gypsum layer). In another embodiment, the sound damping polymer may be included in each gypsum slurry (and corresponding gypsum layer).

Next, a second encasing layer is provided on top of the gypsum slurry such that the gypsum slurry is sandwiched between the encasing layers in order to form the gypsum board. When a first gypsum slurry and a second gypsum slurry are deposited, the second encasing layer may be provided on the second gypsum slurry.

The encasing layer may be any encasing layer as generally employed in the art. For instance, the encasing layer may be a paper encasing layer, a fibrous (e.g., glass fiber) mat encasing layer, or a polymeric encasing layer. In general, the first encasing layer and the second encasing layer may be the same type of material. Alternatively, the first encasing layer may be one type of material while the second encasing layer may be a different type of material.

In one embodiment, the encasing layer may include a paper encasing layer. For instance, both the first and second encasing layers may be a paper encasing layer. Alternatively, in another embodiment, the encasing layer may be a glass mat encasing layer. For instance, both the first and second encasing layers may be a glass mat encasing layer. In a further embodiment, the encasing layer may be a polymeric encasing layer. For instance, both the first and second encasing layers may be a polymeric encasing layer.

After deposition, the calcium sulfate hemihydrate reacts with the water to convert the calcium sulfate hemihydrate into a matrix of calcium sulfate dihydrate. Such reaction may allow for the gypsum to set and become firm thereby allowing for the boards to be cut at the desired length. In this regard, the method may comprise a step of reacting calcium sulfate hemihydrate with water to form calcium sulfate dihydrate or allowing the calcium sulfate hemihydrate to convert to calcium sulfate dihydrate. In this regard, the method may allow for the slurry to set to form a gypsum board.

The method may also comprise a step of cutting a continuous gypsum sheet into a gypsum board. Then, after the cutting step, the method may comprise a step of supplying the gypsum board to a heating or drying device. For instance, such a heating or drying device may be a kiln and may allow for removal of any free water. The temperature and time required for heating in such heating or drying device are not necessarily limited by the present invention.

As indicated above, the sound damping polymer may be present within the gypsum board, in particular the gypsum core of the gypsum board. For instance, the sound damping polymer may be provided within the gypsum core by providing the polymer directly into the gypsum slurry. In one embodiment, the distribution of the sound damping polymer throughout the gypsum core may be substantially homogeneous. In another embodiment, such distribution may be substantially non-uniform or heterogeneous.

While the sound damping polymer can be provided in the gypsum core via the gypsum slurry, it should be understood that the sound damping polymer may be introduced into the gypsum core utilizing other means as well. For instance, the sound damping polymer may be provided at the interface of an encasing layer and the gypsum core. In particular, the sound damping polymer may be provided in-line during the manufacturing process, which is further explained below. For example, after providing a first encasing layer, the sound damping polymer may be applied directly onto the first encasing layer. Thereafter, a gypsum slurry may be provided directly onto the sound damping polymer. By providing the gypsum slurry onto the sound damping polymer in-line, it can allow for penetration of the sound damping polymer into the gypsum slurry because of the fluidity of both the sound damping polymer (and corresponding formulation) and the gypsum slurry. Accordingly, such penetration can allow for the sound damping polymer to also be within the gypsum core, even though it may not have been introduced via the gypsum slurry. For instance, the sound damping polymer may primarily be present at a surface of the gypsum core. In addition, at least some sound damping polymer may also be present on a surface of the gypsum core such that it is present at the interface of the gypsum core and the encasing layer.

As previously mentioned, the present invention is directed to an improved sound damping gypsum board. It also includes a method of making a gypsum slurry including a sound damping polymer and a method of making a gypsum board from a gypsum slurry including a sound damping polymer. However, as indicated above, the sound damping polymer may be introduced to the gypsum core using other means. In this regard, the method may include a step of making a gypsum board by providing a first encasing layer, providing a sound damping polymer on the first encasing layer, providing a gypsum slurry on the sound damping polymer such that the sound damping polymer can penetrate through at least some of the gypsum slurry, and providing a second encasing layer on the gypsum slurry. In one embodiment, prior to applying the second encasing layer, a sound damping polymer may be provided on the gypsum slurry such that the sound damping polymer penetrates the opposing surface of the gypsum core. Thereafter, the second encasing layer may be provided on the sound damping polymer. When providing the sound damping polymer, it may be applied using means known in the art, such as roll coating, spraying, etc. The sound damping polymer may be applied to form a continuous layer, to form a pattern, or in a random manner. Also, when providing the sound damping polymer, it may be utilized according to the disclosure provided above or below to achieve the desired sound damping properties.

In addition to the above, the sound damping gypsum board may also include other aspects that may further enhance the sound damping properties of the gypsum board. For instance, the sound damping gypsum board may also include sound damping layers. In particular, the gypsum board may also include at least one sound damping layer. In certain embodiments, the sound damping gypsum board may include at least two sound damping layers. The sound damping layers may be provided as disclosed in U.S. Pat. No. 9,512,613, U.S. Patent Application Publication No. 2016/0230395, as well as U.S. patent application Ser. No. 15/995,348, all of which are incorporated herein in their entirety.

In general, the sound damping layers may be formed from any of the aforementioned sound damping polymers or their combinations. In addition, the sound damping layer may be formed from a glue, such as a viscoelastic glue. Once applied, the sound damping polymer may be dried in order to form the sound damping layer. Such viscoelastic glue is distinguishable from a polymeric sheet that is simply positioned and may not require any drying to provide a sound damping effect.

The sound damping layer may also be provided with materials or additives that may provide different sound damping effects and performance. For instance, with respect to such additives, one may have a higher density than the other additive. These additives may include, but are not limited to, microspheres (e.g., hollow microspheres, filled microspheres), glass spheres, cenospheres, waste materials, minerals (e.g., high density, low density), metals, etc.

Generally, the gypsum core includes a gypsum layer surface. In particular, the gypsum core includes a first gypsum layer surface and a second gypsum layer surface opposing the first gypsum layer surface. A first sound damping layer may be disposed at a gypsum layer surface. In particular, a first sound damping layer may be disposed at a first gypsum layer surface. In one embodiment, the first sound damping layer may be disposed directly onto the first gypsum layer surface. In another embodiment, the first sound damping layer may be disposed on an encasing layer disposed on the first gypsum layer surface. In a further embodiment, an encasing layer may be present on the first gypsum layer surface wherein at least some, and in some embodiments all, of the encasing layer may be removed and thereafter a sound damping layer may be formed. In this regard, the first sound damping layer may be formed such that it is disposed on the gypsum core and at least some of the encasing layer. In addition, such gypsum layer surface on which the sound damping layer is disposed or adjacent may be a gypsum layer inner surface. In this regard, the gypsum layer also includes a gypsum layer outer surface opposite the gypsum layer inner surface. An encasing material may also be disposed on the gypsum layer outer surface.

In one embodiment, the aforementioned gypsum board may be sandwiched. For instance, two of the aforementioned gypsum boards may be sandwiched or glued together to form a composite gypsum board. In this regard, the sound damping layers formed on each respective gypsum board may be adjacent to one another and such layers may allow for the appropriate adhesion or attachment to maintain the structural integrity of the board.

However, in one embodiment, the sound damping layer may be encased with an encasing layer. In such instance, when the gypsum boards are encased, a further sound damping layer may be formed on such encasing layer. For instance, a sound damping layer may be formed on at least gypsum board and thereafter such gypsum board may be sandwiched with another to form a composite. Alternatively, a sound damping layer may be formed on the encasing layer of both gypsum boards which are then sandwiched to form a composite. In this regard, the composite gypsum board may include three sound damping layers and at least one encasing layers, such as at least two encasing layers.

In a further embodiment, the gypsum boards may not be sandwiched to form a composite. For instance, once the sound damping layer is formed, an encasing layer may be provided on the sound damping layer. In one embodiment, a further sound damping layer may be provided on the encasing layer. Thereafter, another encasing layer may be provided on the sound damping layer.

It should be understood that when multiple sound damping layers are provided, the sound damping layers may be composed of the same materials or different materials or their combinations. For instance, the sound damping layers may have different compositions in one embodiment. In another embodiment, the sound damping layers may have the same compositions, and in particular the same polymer. In a further embodiment, the sound damping layer may comprise the same materials and have the same thicknesses. However, the layer may also have different thicknesses in another embodiment.

Furthermore, it should be understood that the encasing layers may also be present on edges. For instance, the encasing layer may also be present on an edge of the gypsum board wherein the encasing layer connects respective layers and/or encasing layers. For instance, the edge encasing layer may connect the edges of a gypsum layer and a first sound damping layer. When an encasing layer is positioned between the gypsum layer and the first sound damping layer, the edge encasing layer may also connect such encasing layer to the gypsum layer and first sound damping layer. When a second sound damping layer is present, an edge encasing layer may connect the gypsum layer, the first sound damping layer, and the second sound damping layer. When an encasing layer is positioned between the first sound damping layer and the second sound damping layer, an edge encasing layer may also connect such encasing layer to the gypsum layer, the first sound damping layer, and the second sound damping layer.

Thus, as indicated above, the position of the sound damping layer may not necessarily be limited. For instance, the sound damping layer may be present between two gypsum layers or boards. The sound damping layer may be present between a gypsum layer and an encasing layer. The sound damping layer may be present in any combination of the aforementioned.

In addition, when disposed, the sound damping layer may partially or entirely cover the respective surface or layer on which it is disposed or positioned. In one embodiment, the sound damping layer covers the entire surface or layer. In another embodiment, the sound damping layer only partially covers the entire surface or layer.

In addition, the sound damping layer may be a monolithic, homogeneous layer. Alternatively, the sound damping layer may be a heterogeneous or discontinuous layer. Also, the sound damping layer may be provided in the form of an adhesive or glue such that drying may be required in order to form the sound damping layer. For instance, the sound damping layer may be formed from a precursor solution including any polymers as mentioned herein wherein the precursor solution is dried to form the sound damping layer.

Similarly, as mentioned above, the encasing layer may partially or entirely cover the respective surface or layer on which it is disposed or positioned. In one embodiment, the encasing layer covers the entire surface or layer. In another embodiment, the encasing layer only partially covers the entire surface or layer. When the encasing layer only partially covers the entire surface or layer, the sound damping layer may be provided such that it is only on such partial encasing layer. Alternatively, the sound damping layer may be provided such that it is on the partial encasing layer as well as on the surface or layer on which the encasing layer is positioned. For instance, if the encasing layer positioned between the gypsum layer and the first sound damping layer is a partial encasing layer, the first sound damping layer may be positioned or applied on the partial encasing layer and the gypsum layer.

Thus, when forming a gypsum board, the method disclosed herein may also include certain steps. For instance, the method may include forming a sound damping layer as mentioned above. In particular, such layer may be formed by applying a sound damping polymer, or glue, as disclosed herein. In addition, the method may include disposing or providing an encasing layer as mentioned above. In one embodiment, the method may include disposing or providing an encasing layer as mentioned above and thereafter at least partially removing some of the encasing layer prior to forming the sound damping layer. Furthermore, the method may include forming a composite gypsum board by sandwiching or layering two of the aforementioned gypsum boards.

The sound damping gypsum board disclosed herein may have many applications. For instance, the gypsum board may be used as a standalone board in construction for the preparation of walls, ceilings, floors, etc. In addition, the sound damping gypsum board may be installed on an existing or installed gypsum board, wall, or panel. As used in the present disclosure, the term "gypsum board," generally refers to any panel, sheet, or planar structure, either uniform or formed by connected portions or pieces, that is constructed to at least partially establish one or more physical boundaries. Such existing, installed, or otherwise established or installed wall or ceiling structures comprise materials that may include, as non-limiting examples, gypsum, stone, ceramic, cement, wood, composite, or metal materials. The installed gypsum board forms part of a building structure, such as a wall or ceiling. The installation of the sound damping gypsum board as disclosed herein can provide a desired acoustical performance to an existing or installed gypsum board that does not have any sound damping capabilities or ineffective sound damping abilities or can be used to further enhance acoustical performance.

Regardless of the application, the gypsum board as disclosed herein provides the desired sound damping properties. In particular, the gypsum board exhibits a decay time of 2 seconds or less, such as 1.8 seconds or less, such as 1.5 seconds or less, such as 1.3 seconds or less, such as 1 second or less, such as 0.9 seconds or less, such as 0.8 seconds or less, such as 0.7 seconds or less, such as 0.6 seconds or less, such as 0.5 seconds or less, such as 0.4 seconds or less, such as 0.3 seconds or less, such as 0.2 seconds or less, such as 0.1 seconds or less, such as 0.01 seconds or less, such as 0.001 seconds or less. The decay time may be 0.0001 seconds or more, such as 0.001 seconds or more, such as 0.01 seconds or more, such as 0.01 seconds or more, such as 0.1 seconds or more, such as 0.2 seconds or more, such as 0.3 seconds or more, such as 0.4 seconds or more, such as 0.5 seconds or more, such as 0.6 seconds or more, such as 0.7 seconds or more. In general, the lower the decay time, the better the performance of the gypsum board and sound damping properties. In one embodiment, the decay time may be reduced by at least 10%, such as at least 20%, such as at least 30%, such as at least 40%, such as at least 50%, such as at least 60%, such as at least 70%, such as at least 80%, such as at least 90%, such as at least 95% in comparison to a control board. For example, such control board may be the same board as the inventive gypsum board except without the use of the sound damping polymer.

The thickness of the gypsum board, and in particular, the gypsum core, is not necessarily limited and may be from about 0.25 inches to about 1 inch. For instance, the thickness may be at least ¼ inches, such as at least ⁵⁄₁₆ inches, such as at least ⅜ inches, such as at least ½ inches, such as at least ⅝ inches, such as at least ¾ inches, such as at least 1 inch. In this regard, the thickness may be about any one of the aforementioned values. For instance, the thickness may be about ¼ inches. Alternatively, the thickness may be about ⅜ inches. In another embodiment, the thickness may be about ½ inches. In a further embodiment, the thickness may be about ⅝ inches. In another further embodiment, thickness may be about 1 inch. In addition, at least two gypsum boards may be combined to create another gypsum board. For example, at least two gypsum boards having a thickness of about ⁵⁄₁₆ inches each may be combined or sandwiched to create a gypsum board having a thickness of about ⅝ inches. While this is one example, it should be understood that any combination of gypsum boards may be utilized to prepare a sandwiched gypsum board. With regard to the thickness, the term "about" may be defined as within 10%, such as within 5%, such as within 4%, such as within 3%, such as within 2%, such as within 1%.

It should be understood that when a composite gypsum board containing two of the aforementioned gypsum boards is present, such composite may be about twice the aforementioned thickness.

In addition, the board weight of the gypsum board is not necessarily limited. For instance, the gypsum board may have a board weight of 500 lbs/MSF or more, such as about 600 lbs/MSF or more, such as about 700 lbs/MSF or more, such as about 800 lbs/MSF or more, such as about 900 lbs/MSF or more, such as about 1000 lbs/MSF or more, such as about 1100 lbs/MSF or more, such as about 1200 lbs/MSF or more, such as about 1300 lbs/MSF or more, such as about 1400 lbs/MSF or more, such as about 1500 lbs/MSF or more. The board weight may be about 7000 lbs/MSF or less, such as about 6000 lbs/MSF or less, such as about 5000 lbs/MSF or less, such as about 4000 lbs/MSF or less, such as about 3000 lbs/MSF or less, such as about 2500 lbs/MSF or less, such as about 2000 lbs/MSF or less, such as about 1800 lbs/MSF or less, such as about 1600 lbs/MSF or less, such as about 1500 lbs/MSF or less, such as about 1400 lbs/MSF or less, such as about 1300 lbs/MSF or less, such as about 1200 lbs/MSF or less. Such board weight may be a dry board weight such as after the board leaves the heating or drying device (e.g., kiln).

In addition, the gypsum board may have a density of about 5 pcf or more, such as about 10 pcf or more, such as about 15 pcf or more, such as about 20 pcf or more. The board may have a density of about 60 pcf or less, such as about 50 pcf or less, such as about 40 pcf or less, such as about 35 pcf or less, such as about 33 pcf or less, such as about 30 pcf or less, such as about 28 pcf or less, such as about 25 pcf or less, such as about 23 pcf or less, such as about 20 pcf or less.

The gypsum board may have a certain nail pull resistance, which generally is a measure of the force required to pull a gypsum panel off of a wall by forcing a fastening nail through the panel. The values obtained from the nail pull test generally indicate the maximum stress achieved while the fastener head penetrates through the board surface and core. In this regard, the gypsum board exhibits a nail pull resistance of at least about 25 $lb_f$, such as at least about 30 pounds, such as at least about 35 $lb_f$, such as at least about 40 $lb_f$, such as at least about 45 $lb_f$, such as at least about 50 $lb_f$, such as at least about 55 $lb_f$, such as at least about 60 $lb_f$, such as at least about 65 $lb_f$, such as at least about 70 $lb_f$, such as at least about 75 $lb_f$, such as at least about 77 $lb_f$, such as at least about 80 $lb_f$, such as at least about 85 $lb_f$, such as at least about 90 $lb_f$, such as at least about 95 $lb_f$, such as at least about 100 $lb_f$ as tested according to ASTM C1396. The nail pull resistance may be about 150 $lb_f$ or less, such as about 140 $lb_f$ or less, such as about 130 $lb_f$ or less, such as about 120 $lb_f$ or less, such as about 110 $lb_f$ or less, such as about 105 $lb_f$ or less, such as about 100 $lb_f$ or less, such as about 95 $lb_f$ or less, such as about 90 $lb_f$ or less, such as about 85 $lb_f$ or less, such as about 80 $lb_f$ or less as tested according to ASTM C1396. Such nail pull resistance may be based upon the thickness of the gypsum board. For instance, when conducting a test, such nail pull resistance values may vary depending on the thickness of the gypsum board. As an example, the nail pull resistance values above may be for a ⅝ inch board. However, it should be understood that instead of a ⅝ inch board, such nail pull resistance values may be for any other thickness gypsum board as mentioned herein.

The gypsum board may have a certain compressive strength. For instance, the compressive strength may be about 150 psi or more, such as about 200 psi or more, such as about 250 psi or more, such as about 300 psi or more, such as about 350 psi or more, such as about 375 psi or more, such as about 400 psi or more, such as about 500 psi or more as tested according to ASTM C473. The compressive strength may be about 3000 psi or less, such as about 2500 psi or less, such as about 2000 psi or less, such as about 1700 psi or less, such as about 1500 psi or less, such as about 1300 psi or less, such as about 1100 psi or less, such as about 1000 psi or less, such as about 900 psi or less, such as about 800 psi or less, such as about 700 psi or less, such as about 600 psi or less, such as about 500 psi or less. Such compressive strength may be based upon the thickness of the gypsum board. For instance, when conducting a test, such compressive strength values may vary depending on the thickness of the gypsum board. As an example, the compressive strength values above may be for a ⅝ inch board. However, it should be understood that instead of a ⅝ inch board, such compressive strength values may be for any other thickness gypsum board as mentioned herein.

In addition, the gypsum board may have a core hardness of at least about 8 $lb_f$, such as at least about 10 $lb_f$, such as at least about 11 $lb_f$, such as at least about 12 $lb_f$, such as at least about 15 $lb_f$, such as at least about 18 $lb_f$, such as at least about 20 $lb_f$ as tested according to ASTM C1396. The gypsum board may have a core hardness of 50 $lb_f$ or less, such as about 40 lb_f or less, such as about 35 lb_f or less, such as about 30 lb_f or less, such as about 25 lb_f or less, such as about 20 lb_f or less, such as about 18 lb_f or less, such as about 15 lb_f or less as tested according to ASTM C1396. In addition, the gypsum board may have an end hardness according to the aforementioned values. Further, the gypsum board may have an edge hardness according to the aforementioned values. Such core hardness may be based upon the thickness of the gypsum board. For instance, when conducting a test, such core hardness values may vary depending on the thickness of the gypsum board. As an example, the core hardness values above may be for a ⅝ inch board. However, it should be understood that instead of a ⅝ inch board, such core hardness values may be for any other thickness gypsum board as mentioned herein.

EXAMPLES

Example 1

This example demonstrates use of the sound damping polymer within the gypsum core by providing the polymer into the gypsum slurry. The samples were tested for decay time using Adobe Audition software by Adobe Systems. In particular, nominal 12" by 12" samples were suspended on a wire and impacted on one side with consistent force using a hammer with an accelerometer affixed to the opposite side from the point of impact. The decay time was determined through the software interface by denoting the period between the initial time of impact with the sample and the time when the amplitude of the sound signal approached zero. The average of three tests was used to report the sample decay time.

| Board ID | Thickness (inches) | Weight (lb/MSF) | Decay Time (seconds) |
| --- | --- | --- | --- |
| Control board without sound damping polymer in the gypsum core | 0.5 | 2118 | 0.39 |
| Board with about 9.5% sound damping polymer (based on stucco weight) in the gypsum core | 0.5 | 2072 | 0.245 |
|  | 0.5 | 2090 | 0.12 |
| Two control boards without sound damping polymer in the gypsum core laminated together with sound damping polymer | 1 | 4200 | 0.009 |
| Two boards with about 9.5% sound damping polymer (based on stucco weight) in the gypsum core laminated together with sound damping polymer | 1 | 4226 | 0.007 |
| Control SoundBreak ® XP ® board using two 5/16 inch boards laminated together with sound damping polymer | 0.625 | 2700 | 0.015 |

Example 2

This example demonstrates use of the sound damping polymer within the gypsum core by providing the polymer at the interface of an encasing layer and the gypsum slurry such that the polymer is allowed to penetrate at least some of the gypsum slurry and be present within the core.

Samples were tested for decay time using SigView software made by SignalLab. Nominal 12" by 12" samples were suspended on a wire and impacted on one side with consistent force using a hammer with an accelerometer affixed to the opposite side from the point of impact. The decay time was determined through the software interface by denoting the period between the initial time of impact with the sample and the time when the amplitude of the sound signal approached zero. The average of three tests was used to report sample decay time.

| Sample | Thickness (inches) | Weight (lbs/MSF) | Decay Time (seconds) |
| --- | --- | --- | --- |
| ½" Series | | | |
| Control board without any sound damping polymer | 0.50 | 2470 | 1.51 |
| Sound damping polymer applied to interior of encasing layer (no additives mixed with polymer) | 0.50 | 2470 | 0.67 |
| Sound damping polymer applied to interior of encasing layer—(landplaster blended with polymer) | 0.50 | 2490 | 0.72 |
| Sound damping polymer applied to interior of encasing layer—(cellulose fibers blended with polymer) | 0.50 | 2490 | 0.78 |
| Control board with sound damping polymer on exterior of encasing layer with additional encasing layer over polymer | 0.50 | 2580 | 0.89 |
| ⅝" Inch Series | | | |
| Control board including two ¼" panels sandwiched and glued with sound damping polymer | 0.625 | 2590 | 0.31 |
| Control board without any sound damping polymer | 0.625 | 2890 | 0.87 |
| Control board with sound damping polymer on exterior of encasing layer with additional encasing layer over polymer | 0.625 | 2980 | 0.62 |
| Board with sound damping polymer applied to interior of encasing layer | 0.625 | 2730 | 0.47 |
| Sandwich Series | | | |
| Control board using two ½" boards with no sound damping polymer in the core | 1.00 | 4940 | 0.34 |
| Control board with no sound damping polymer in the core + control board with sound damping polymer between encasing layer and a second exterior encasing layer | 1.00 | 5050 | 0.38 |
| Control board with no sound damping polymer in the core + board with sound damping polymer applied to interior of encasing layer | 1.00 | 4940 | 0.24 |
| Control board using two ½" boards with sound damping polymer between the boards | 1.00 | 4970 | 0.23 |

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:
1. A gypsum board comprising:
a gypsum core including a first gypsum layer surface and a second gypsum layer surface opposing the first gypsum layer surface, the gypsum core including a first gypsum layer comprising gypsum and a sound damping polymer and a second gypsum layer comprising gypsum,
a first encasing layer disposed on the first gypsum layer surface wherein the first gypsum layer is between the first encasing layer and the second gypsum layer, and a second encasing layer disposed on the second gypsum layer surface.

2. The gypsum board of claim 1, wherein the sound damping polymer comprises a viscoelastic polymer.

3. The gypsum board of claim 1, wherein the sound damping polymer comprises an acrylic polymer or copolymer.

4. The gypsum board of claim 1, wherein the first gypsum layer further comprises a plasticizer, a starch, or a mixture thereof.

5. The gypsum board of claim 1, wherein the second gypsum layer further comprises a plasticizer, a starch, or a mixture thereof.

6. The gypsum board of claim 1, wherein the sound damping polymer is present in an amount of from 0.001 wt. % to 10 wt. % based on the weight of gypsum.

7. The gypsum board of claim 1, wherein the sound damping polymer is present in an amount of from 0.001 wt. % to 2.5 wt. % based on the weight of gypsum.

8. The gypsum board of claim 1, wherein the sound damping polymer is present in an amount of from 0.1 wt. % to 1.5 wt. % based on the weight of gypsum.

9. The gypsum board of claim 1, wherein the sound damping polymer is present in an amount of from 0.001 lbs/MSF to 150 lbs/MSF.

10. The gypsum board of claim 1, wherein the sound damping polymer is present in an amount of from 0.1 lbs/MSF to 15 lbs/MSF.

11. The gypsum board of claim 1, wherein the second gypsum layer further comprises the sound damping polymer.

12. The gypsum board of claim 1, wherein the gypsum board is a composite board having a second gypsum board comprising a second gypsum core adjacent the first encasing layer.

13. The gypsum board of claim 1, wherein the gypsum board exhibits a sound transmission loss of 20% or more in comparison to a board without a sound damping polymer.

14. The gypsum board of claim 1, wherein the gypsum board exhibits a decay time of 1 second or less.

15. The gypsum board of claim 1, wherein the gypsum board exhibits a decay time of 0.8 seconds or less.

16. A method of forming the gypsum board of claim 1, the method comprising:
providing a first encasing layer,
depositing a first gypsum slurry comprising stucco, water, and the sound damping polymer on the first encasing layer for forming the first gypsum layer,
depositing a second gypsum slurry comprising stucco and water on the first gypsum slurry for forming the second gypsum layer,
providing a second encasing layer on the second gypsum slurry, and
allowing the stucco to convert to calcium sulfate dihydrate.

17. The method of claim 16, wherein the first gypsum slurry further comprises a plasticizer, a starch, or a mixture thereof.

18. The method of claim 16, wherein the second gypsum slurry further comprises a plasticizer, a starch, or a mixture thereof.

* * * * *